US008550318B2

(12) United States Patent
Tortumlu

(10) Patent No.: US 8,550,318 B2
(45) Date of Patent: Oct. 8, 2013

(54) BRACKET FOR TOWING SINGLE AND MULTIPLE TRASH BINS

(76) Inventor: Asim Tortumlu, Austin, TX (US)

( * ) Notice: Subject to any disclaimer, the term of this patent is extended or adjusted under 35 U.S.C. 154(b) by 348 days.

(21) Appl. No.: 12/912,497

(22) Filed: Oct. 26, 2010

(65) Prior Publication Data

US 2011/0095061 A1 Apr. 28, 2011

Related U.S. Application Data

(60) Provisional application No. 61/255,538, filed on Oct. 28, 2009.

(51) Int. Cl.
*B60R 9/06* (2006.01)
*B60D 1/14* (2006.01)

(52) U.S. Cl.
USPC .......................................... 224/520; 280/480

(58) Field of Classification Search
USPC ......... 224/520, 928; 280/480, 493; 414/462; D34/10
See application file for complete search history.

(56) References Cited

U.S. PATENT DOCUMENTS 2,704,165 A * 3/1955 Hoover ......................... 414/456
3,237,968 A * 3/1966 Arsenault ..................... 280/492
5,711,543 A * 1/1998 Stokes .......................... 280/504
6,033,178 A * 3/2000 Cummins ...................... 414/462
6,164,896 A * 12/2000 Cummins ...................... 414/462
6,203,032 B1 * 3/2001 Ramos ....................... 280/47.19
6,309,167 B1 * 10/2001 McPherrin .................... 414/457
6,361,264 B1 * 3/2002 Guthrie et al. ................ 414/462
6,379,099 B1 * 4/2002 Novak .......................... 414/421
D507,688 S * 7/2005 Jean .............................. D34/10
D519,702 S * 4/2006 Boxhorn ........................ D34/10
7,021,644 B1 * 4/2006 Master .......................... 280/480
7,217,078 B2 * 5/2007 Short ............................ 414/462
7,614,637 B1 * 11/2009 Kidd ............................. 280/480
8,162,192 B1 * 4/2012 Sanchez ........................ 224/521
D665,641 S * 8/2012 Raleigh ............................ D8/28
2004/0164517 A1 * 8/2004 Lewy et al. ................... 280/493
2004/0232184 A1 * 11/2004 Moen et al. ................... 224/510
2005/0023796 A1 * 2/2005 Rasmussen ................... 280/400
2006/0291985 A1 * 12/2006 Sullivan ........................ 414/462
2008/0101899 A1 * 5/2008 Slonecker ..................... 414/462

* cited by examiner

*Primary Examiner* — Justin Larson

(57) ABSTRACT

A trash bin towing bracket utilized to tow single or multiple trash bins of the conventional, single handle, wheeled type, with hinged lids. In a preferred embodiment, the bracket consists one cut and shaped rigid metal sheet or Acrylonitrile Butadiene Styrene (ABS) or similar resins. The device can be easily attached to almost any common trailer hitch ball (automobile, tractor, SUV). Aforementioned bracket also used to attach a second or more trash bins to each other for to allow multiple bins to be towed simultaneously.

8 Claims, 13 Drawing Sheets

BRACKET FOR TOWING SINGLE AND MULTIPLE TRASH BINS

CROSS-REFERENCES TO RELATED APPLICATIONS

Not Applicable

FEDERALLY SPONSORED RESEARCH

Not Applicable

CROSS-REFERENCE TO RELATED APPLICATION

This application claims the benefit of U.S. Provisional Patent Application Ser. No. 61,255,538 filed Oct. 28, 2009.

BACKGROUND

1. Field

The present invention generally relates to towing devices. More specifically, the invention is designed for towing one or multiple conventional wheeled trash bins, wheeled trash cans, trash carts or receptacles with hinged lids, simultaneously.

2. Prior Art

Description of Related Art

Dragging the trash bin to the trash pickup point is a weekly chore that is ritualistically performed in almost all urban and suburban homes. Even the commencement of wheeled trash bin, the aforementioned chore can be an exhausting task. This is especially true if the home has steep driveway up to or a long distance from trash pickup point. Nowadays most municipalities implement Recycle Programs which requires an additional wheeled trash bin. Furthermore if the home-owner is disabled or elderly or the trash bin is heavily loaded, this task requires some type of transportation of the trash and recycled materials to the pick-up point. In any of such instances, it would be advantageous to have a simple device that could be utilized to tow the wheeled trash bin behind the family automobile, pickup truck, SUV, golf cart or a garden tractor without lifting and loading to such vehicle.

The prior art is replete with devices for towing wheeled trash bins. For example Patent Application Publication US 2004/0164517 A1 (Lewy) show device for transporting wheeled trash cans. It is noted, however, that the device needs to be attached to the special hitch receiver by bolts and nuts and consist of 6 metal pieces welded together. Lewy device using upholding force by horseshoe handles against gravity to secure the trash bin. Furthermore the device requires occasional oiling to prevent rusting. It requires still somehow delicate effort to engage the device to hitch receiver even with suggested pins. If the user has gloves to protect hands from weather, fact that the device requires small pieces to be engaged to hitch receiver, user needs to remove gloves and insert pins, nuts or bolts. The device is not suitable for elderly and disabled.

U.S Patent Application Publication US 2004/0232184 (Moen) shows vehicle tow accessory for wheeled receptacle. It is noted, however, the accessory for towing a trash can is complex, structured with many adjustments for different size trash bins. Furthermore it requires multiple chains or tethers and requires large storage area to store or left it attached to the vehicle.

U.S. Pat. Nos. 6,033,178 and 6,164,896 (both to Cummins) show devices for transporting wheeled trash cans. It is noted, however, that the devices are utilized to lift the trash can from the ground. Furthermore, the devices employ several moving parts, which are subject to wear and malfunction.

U.S. Pat. No. 7,217,078 B2 (Short) and U.S. Pat. No. 6,361,264 B1 (Guthrie) show a device for transporting trash bins one place to another, however, transporter includes a lifter which manually engages, lifts and holds the container for transportation. User needs to lift the trash bin in order to engage it to the transporter.

U.S. Pat. No. 5,711,543 (Strokes) and U.S. Pat. No. 6,203,032 B1 (Ramos) and U.S. Pat. No. 6,309,167 (McPherrin) disclose towing assemblies which employ relatively intrude system for attachment to a towing vehicle and as in the art cited above, all include a number of moving parts which are subject to wear and would need replacing.

U.S. Pat. No. 3,237,968 (Arsenault) is drawn to structure for towing wheeled golf carts. The disclosed structure is not suitable for towing conventional wheeled trash cans.

U.S. Pat. No. 6,379,099 B1 (Novak) discloses apparatus for lifting and rotating garbage dumpsters, the patentee does not contemplate providing any structure to tow the dumpster.

None of the above inventions and patents either singly or combination, is seen to disclose a durable and trash can towing of simple, secure and economical construction, as will subsequently be described and claimed in the present invention.

Furthermore none of the inventions and patterns either single or combination, is capable of towing multiple trash bins at the same time with subsequently be described and claimed in the present invention.

SUMMARY

In accordance with one embodiment the trash bin towing bracket comprises a body having ranks of obtuse angles, having with one end with an aperture to engage into vertical upright body such as a hitch ball at the rear end of a vehicle with a shape hook to engage into a trash bin lifting handle and an end to engage into trash bin.

I presently contemplate for this embodiment that the trash bin bracket have a rectangular cross section and made of austenitic steel. However it can have different cross sections such as oval, triangular, circular etc., and different sizes and materials, such as stainless steel, aluminum, high carbon steel, titanium, polycarbonate, ABS etc.

BRIEF DESCRIPTION OF THE SEVERAL DRAWINGS

Figures

Similar reference characters denote corresponding features consistently throughout the attached drawings.

DRAWINGS

Reference Numerals

Figure 1:
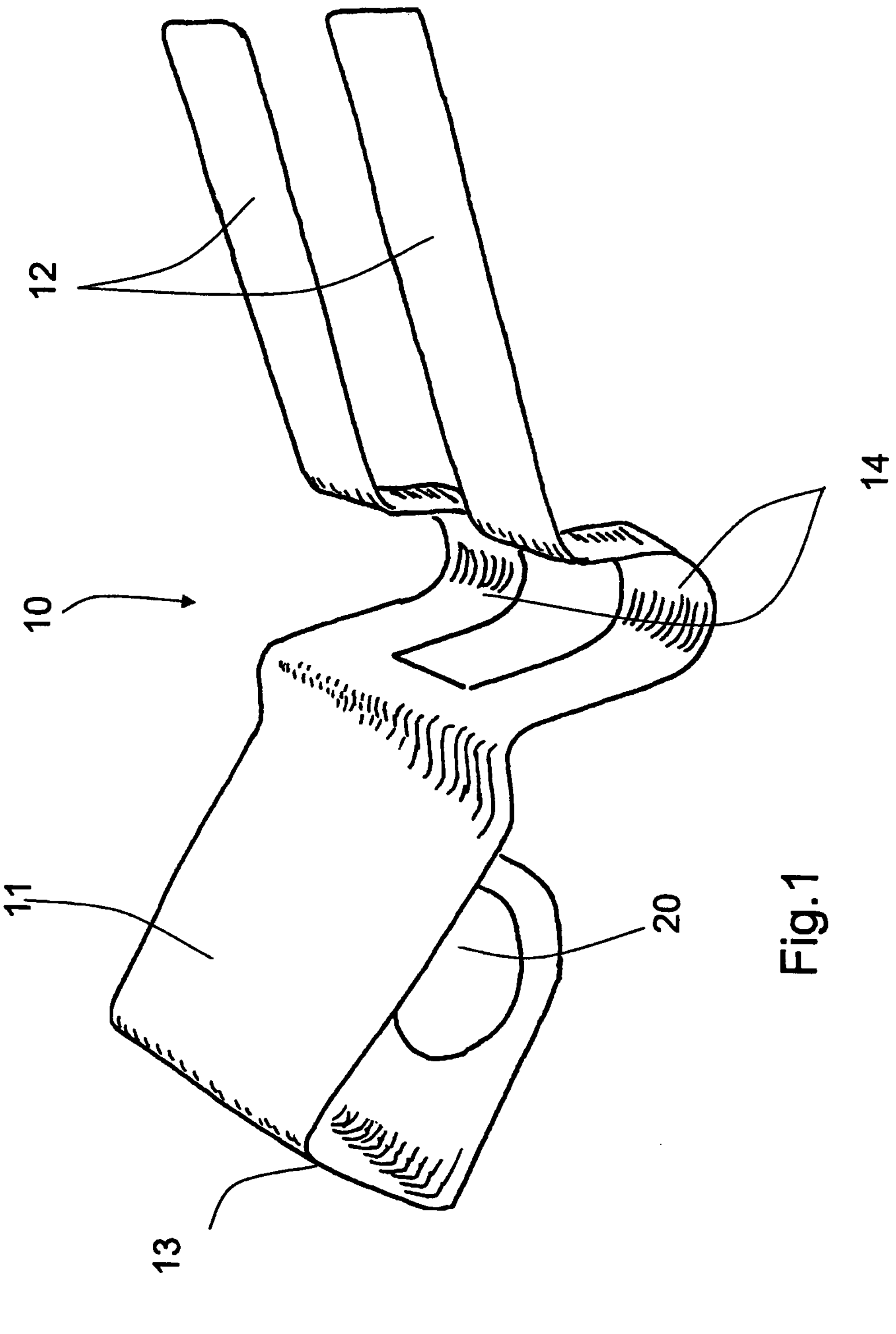
FIG. 1 is a perspective view of the trash bin towing bracket in accordance with first embodiment.

10—trash bin towing bracket
11-first end referred as receiving end
12—second end referred as mounting end
13—hook
14—handle rest
20—aperture
V—vehicle
H—trash bin handle
B—hitch ball
T—trash bin
C—trash bin lid
L—trash bin lifting handle for automated pick-up

DETAILED DESCRIPTION OF DRAWINGS

Similar reference characters denote corresponding features consistently throughout the attached drawings.

Figure 2:
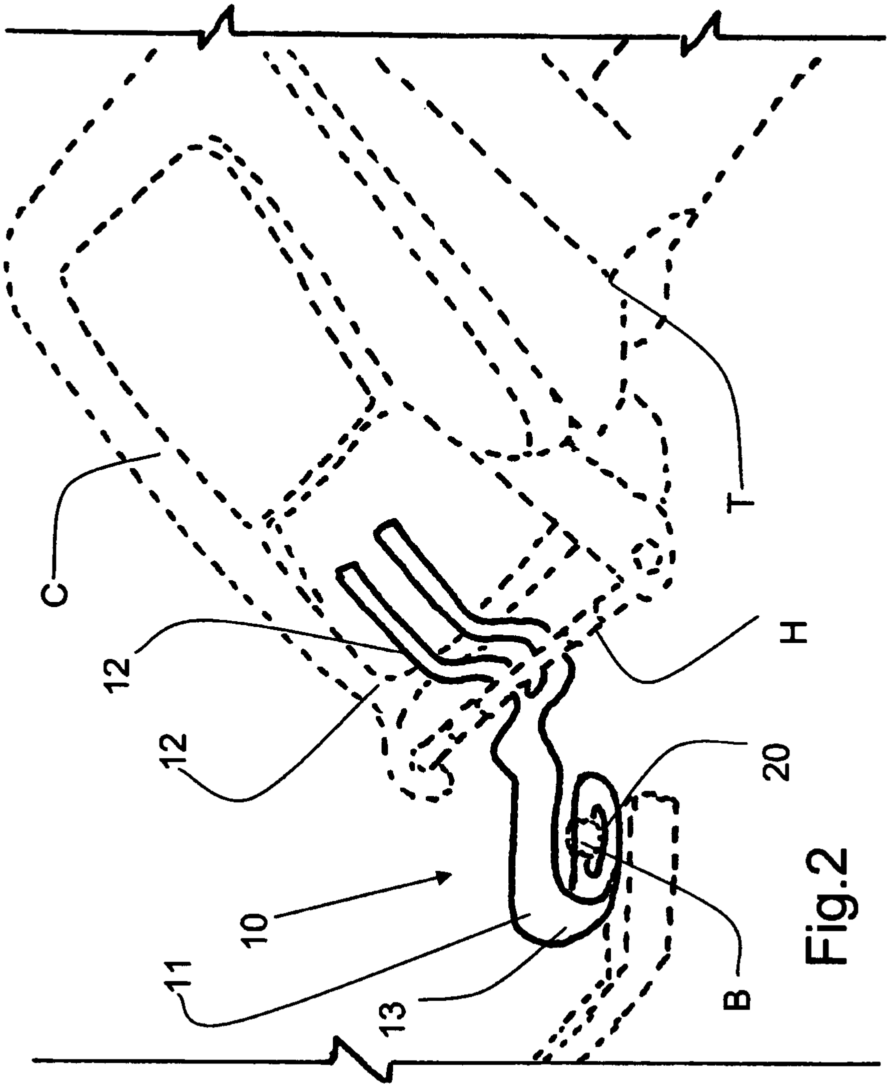
FIG. 2 is an environmental, perspective view of the trash bin towing bracket according to first embodiment.

Attention is first directed to FIGS. 1 and 2 wherein the trash bin towing bracket of my first embodiment is generally indicated as 10.

Towing bracket has a first end shown as 11 and second end shown as 12.

The first end, 11, consists of a round aperture indicated as 20 at FIG. 1.

The first end, 11, round aperture, 20, at towing bracket, 10, is adapted to receive a hitch ball, B, of a vehicle, not shown.

Furthermore the first end, 11, has bended obtuse exterior angle of 360 degrees to form a hook towards bottom of bracket.

The second end, 12, of the towing bracket is adapted to engage the handle, H, of a wheeled trash bin with lid by through the aperture between the rim of the trash bin and its handle, H.

As best seen in FIG. 1, the towing bracket consists one body part fabricated from a rigid material.

Figure 3:
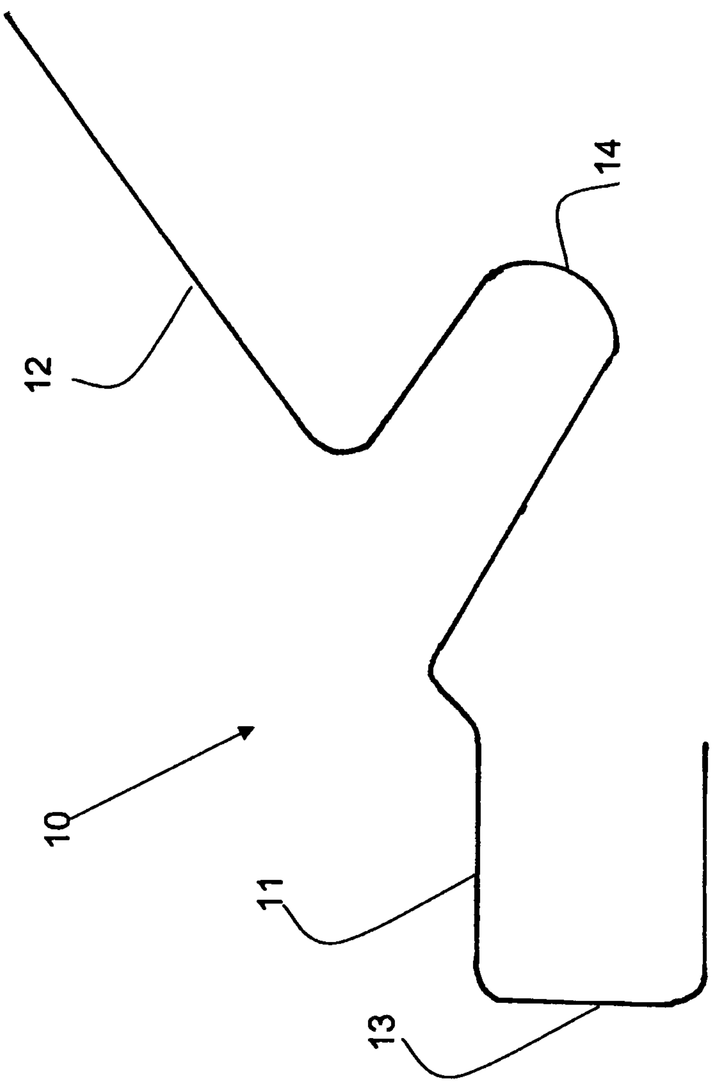
FIG. 3 is side elevation view of the trash bin towing bracket according to first embodiment.

FIG. 3 side elevation view shows ranks of obtuse angles to form the shape of my first embodiment the of trash bin bracket.

Figure 4:
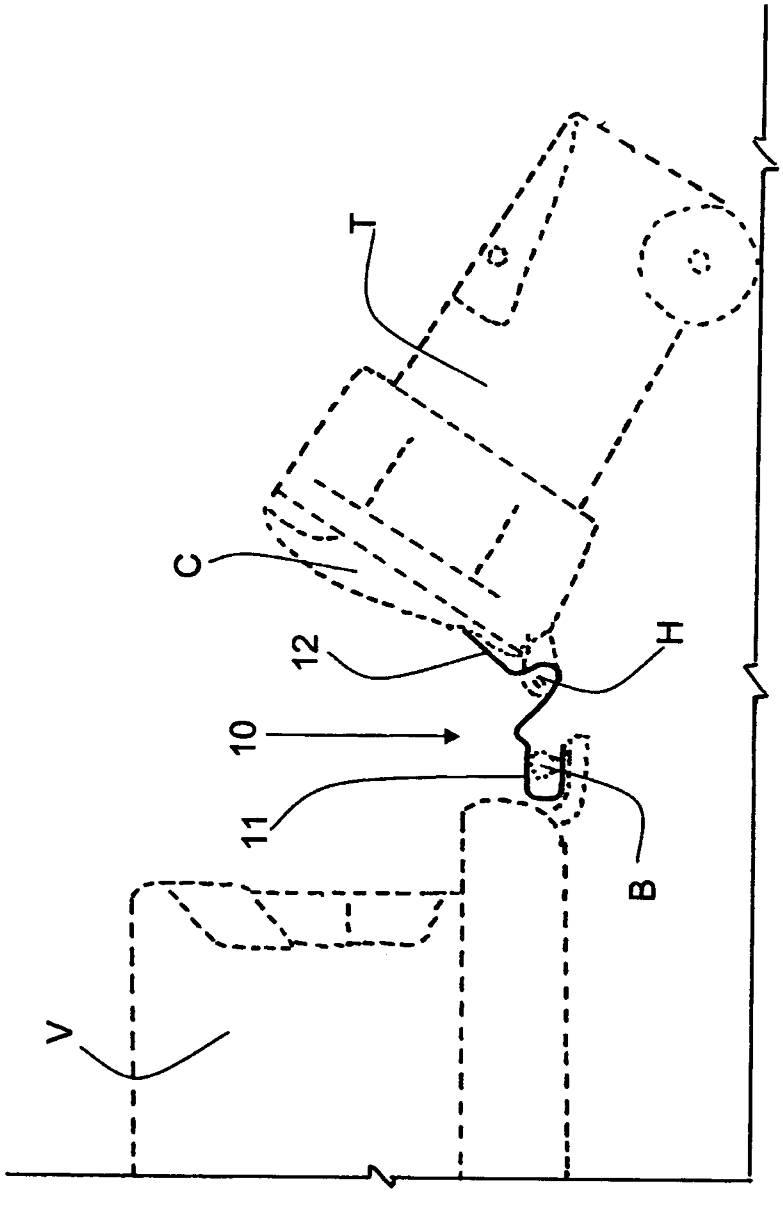
FIG. 4 is a environmental, side elevation view of the trash bin towing bracket engaged into a hitch ball of a vehicle and engaged into a conventional trash bin.

FIG. 4 shows the environmental, side elevation view of the towing bracket, 10, engaged into trash bin, T, and the towing vehicle hitch ball, B, the second end, 12, inserted between the handles of the trash bin, H, and its body and rests on the trash bin lid, C.

The obtuse interior angle of the receiving end, 11, and the mounting end, 12, is approximately one-hundred-twenty degrees.

Figure 5:
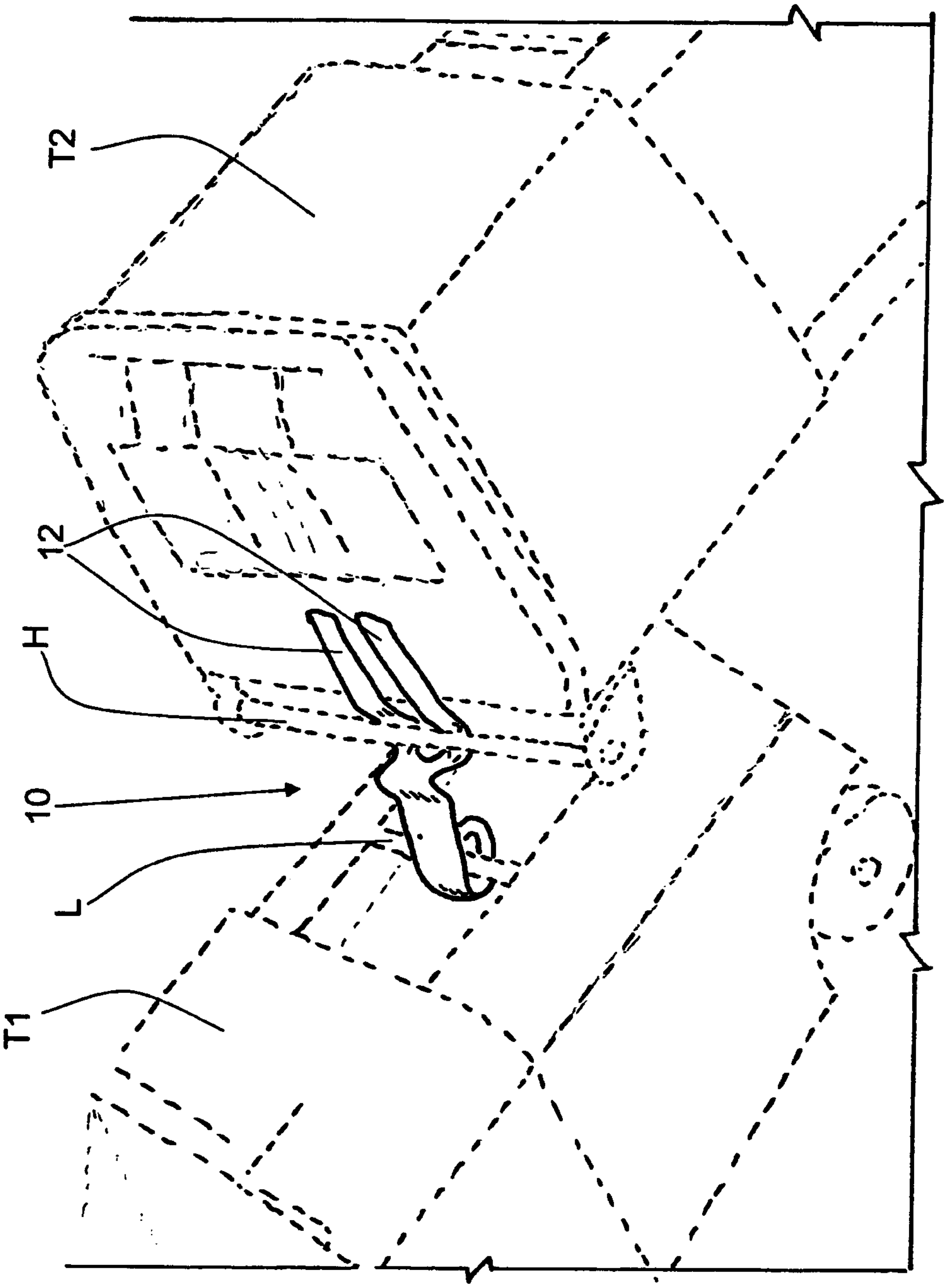
FIG. 5 is an environmental, perspective view of the trash bin towing bracket engaged into conventional trash bin lifting handle.

As shown in FIG. 5, most of the conventional wheeled trash bins has a molded lifting handle, L, for automated cart lifting equipment or trash truck, not shown. The hook shaped second end, 13, forming to be inserted between the lifting handle of a trash bin and its body.

Figure 6:
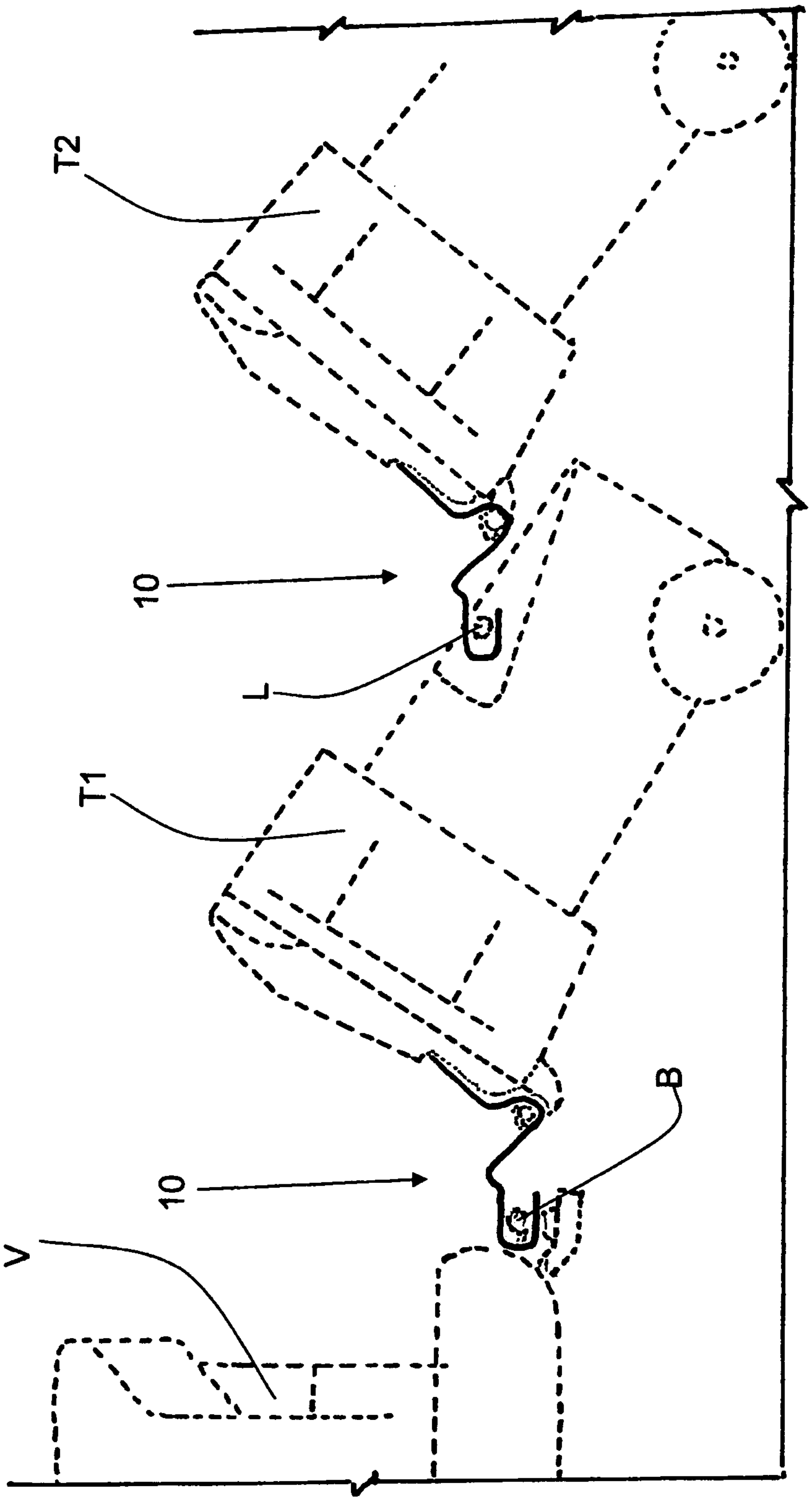
FIG. 6 is an environmental side elevation view of a trash bin towing bracket used to attach one trash bin into another trash bin, allowing multiple bins to be towed in accordance with first embodiment.

As best seen in FIG. 6, the first end of the bracket, 11, inserted to the molded lifting handle, L, of a tilted trash bin which is already attached to the vehicle by the aforementioned action.

Figure 7:
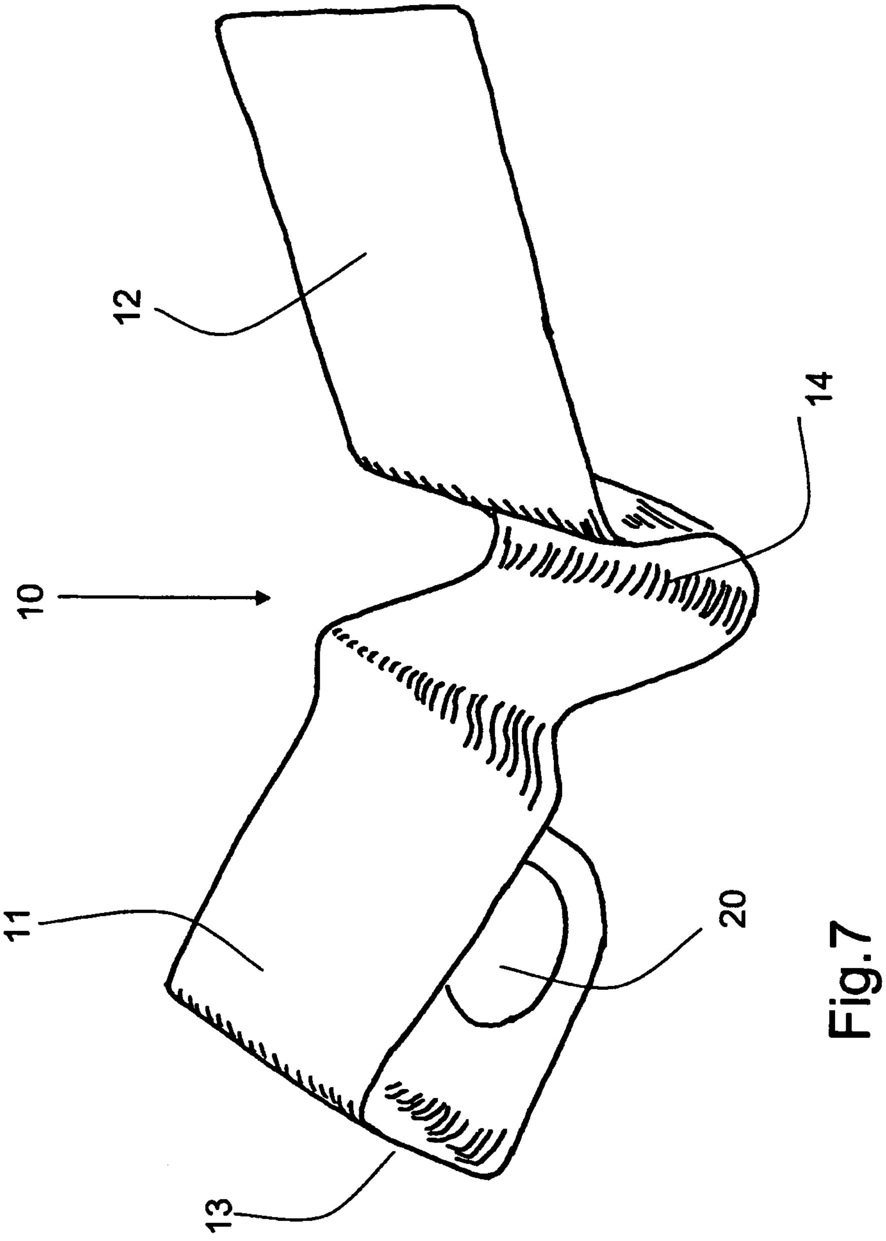
FIG. 7 is a perspective view of the trash bin towing bracket in accordance with another embodiment.

FIG. 7 illustrates an alternative embodiment of the invented bracket.

Figure 8:
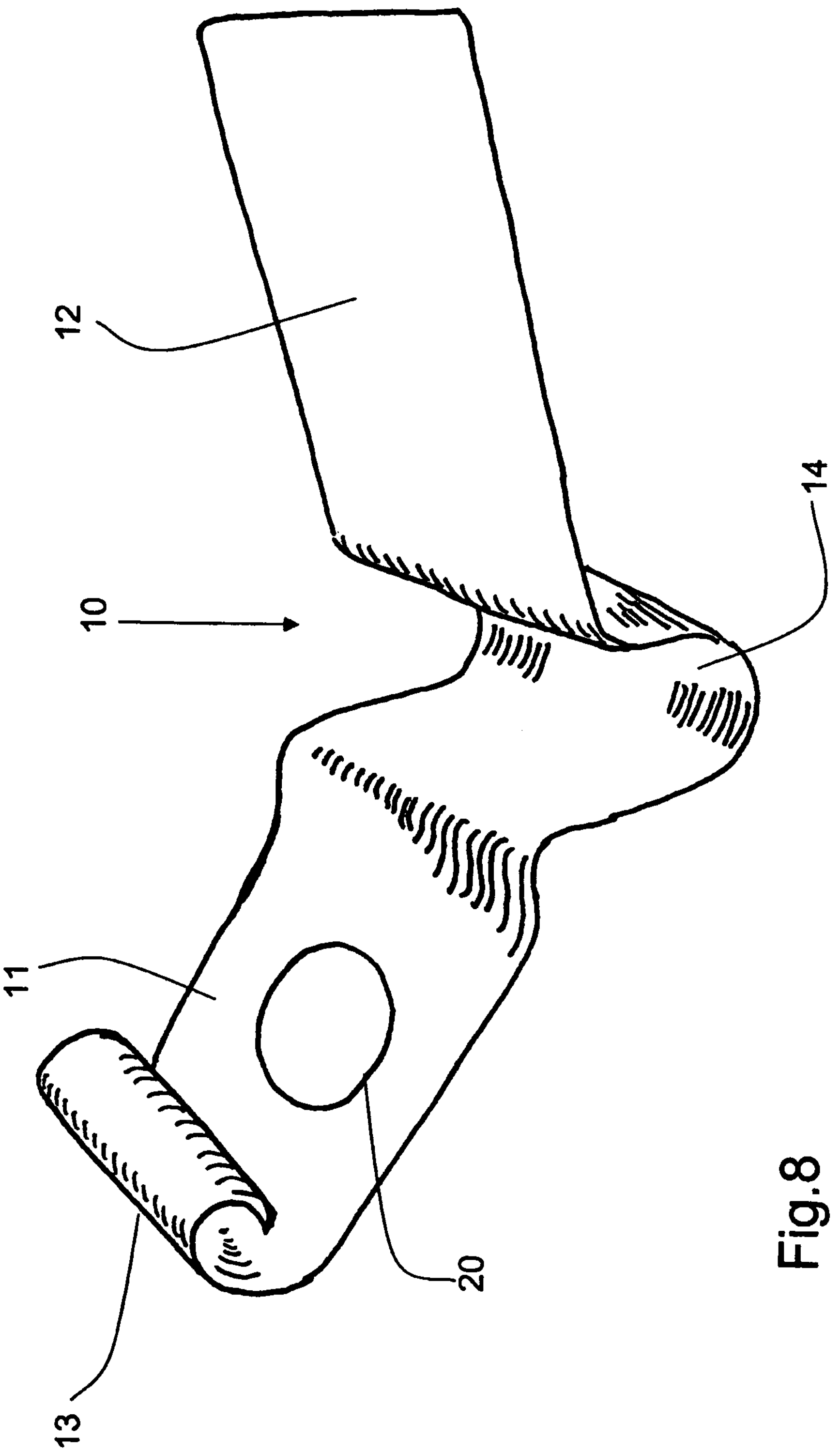
FIG. 8 is a perspective view of the trash bin towing bracket in accordance with another embodiment.

FIG. 8 shows another embodiment of the invented bracket.

Figure 9:
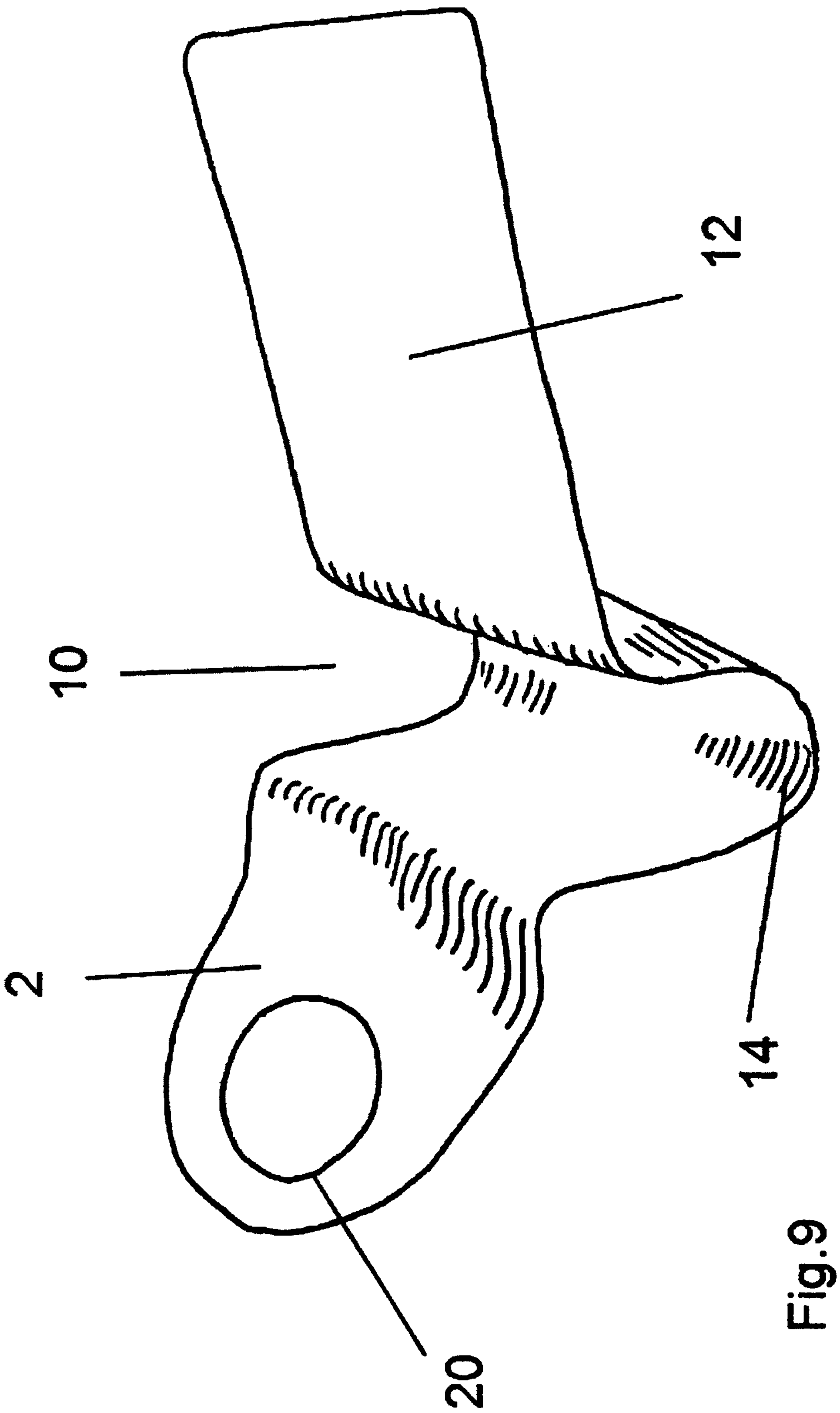
FIG. 9 is a perspective view of the trash bin towing bracket in accordance with second embodiment.
Figure 10:
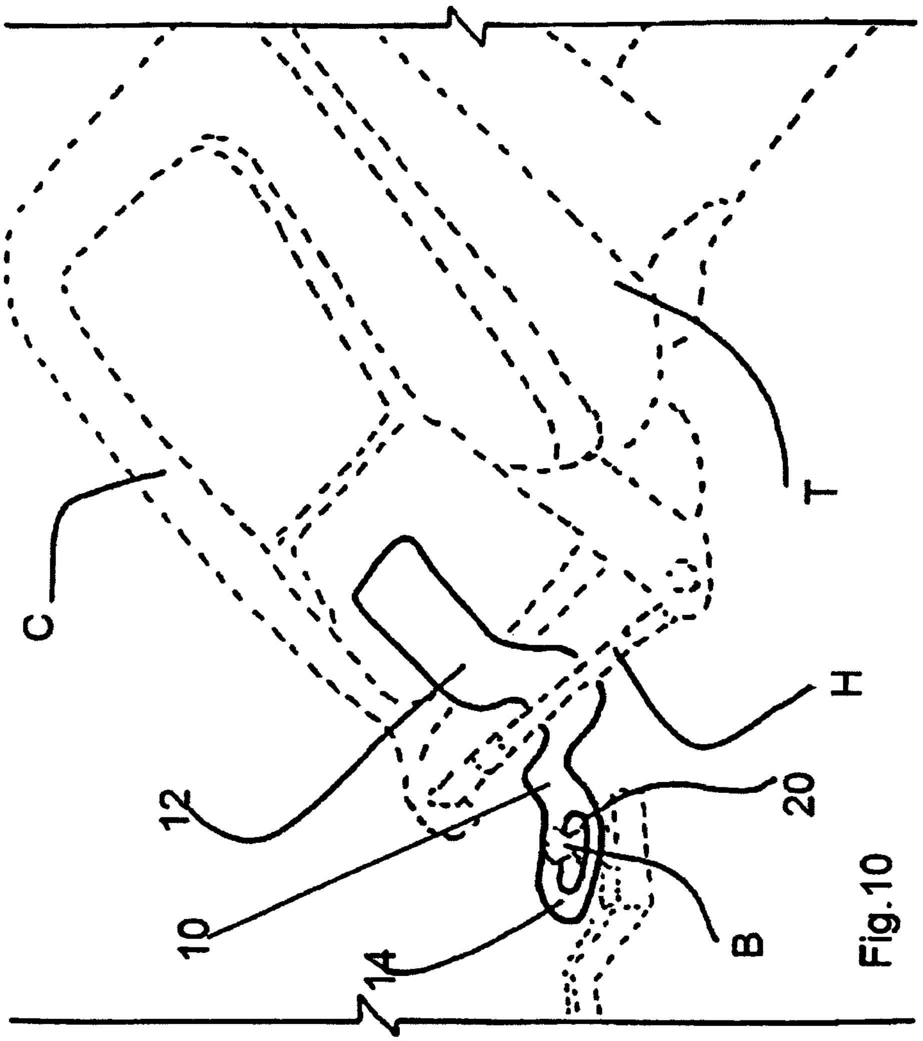
FIG. 10 is an environmental, perspective view of the trash bin towing bracket according to second embodiment.

Attention is first directed to FIGS. 9 and 10 wherein the trash bin towing bracket of my second embodiment is generally indicated as 10.

Towing bracket has a first end shown as 11 and second end shown as 12.

The first end, 11, consists of a round aperture indicated as 20 at FIG. 9.

The first end, 11, round aperture, 20, at towing bracket, 10, is adapted to receive a hitch ball, B, of a vehicle, not shown.

The second end, 12, of the towing bracket is adapted to engage the handle, H, of a wheeled trash bin with lid by through the aperture between the rim of the trash bin and its handle, H.

As best seen in FIG. 9, the towing bracket consists one body part fabricated from a rigid material.

Figure 11:
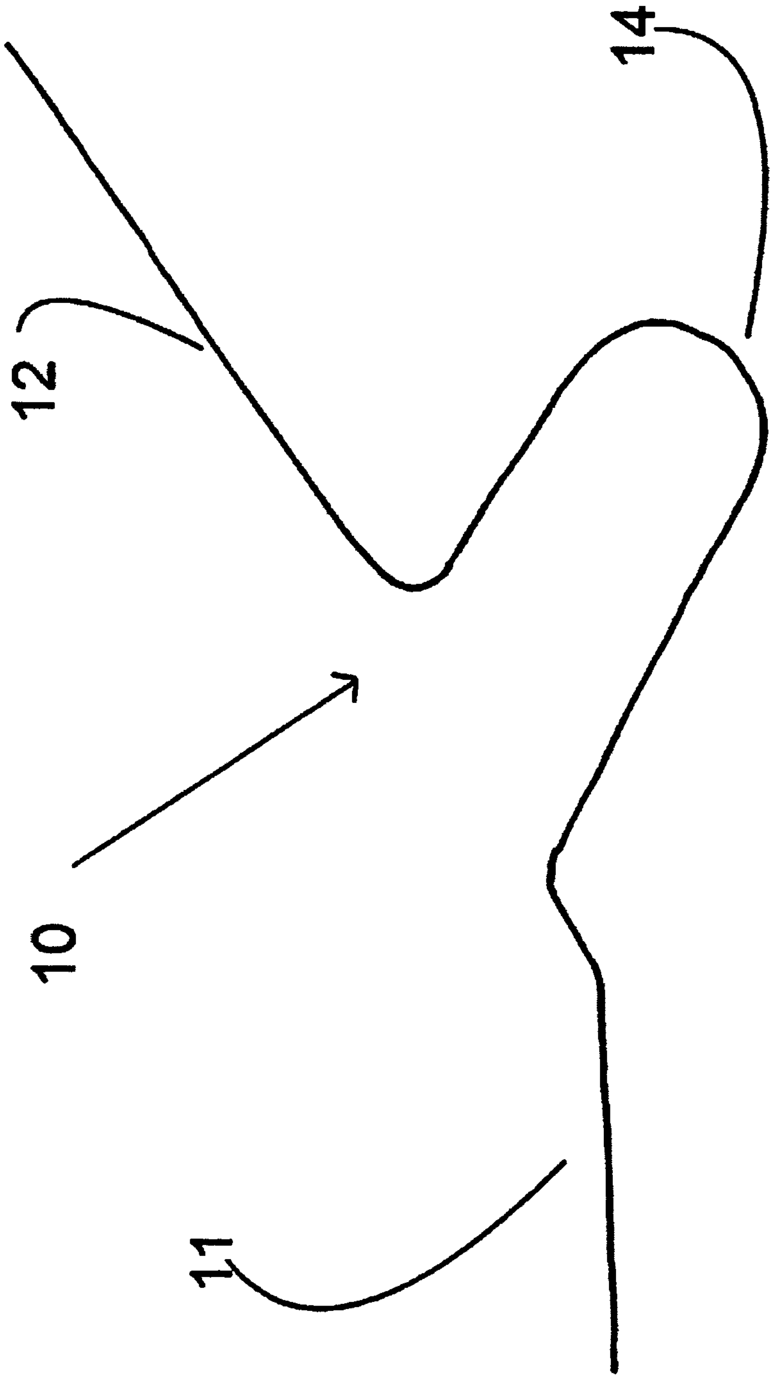
FIG. 11 is side elevation view of the trash bin towing bracket according to second embodiment.

FIG. 11 side elevation view shows ranks of obtuse angles to form the shape of my second embodiment the of trash bin bracket.

Figure 12:
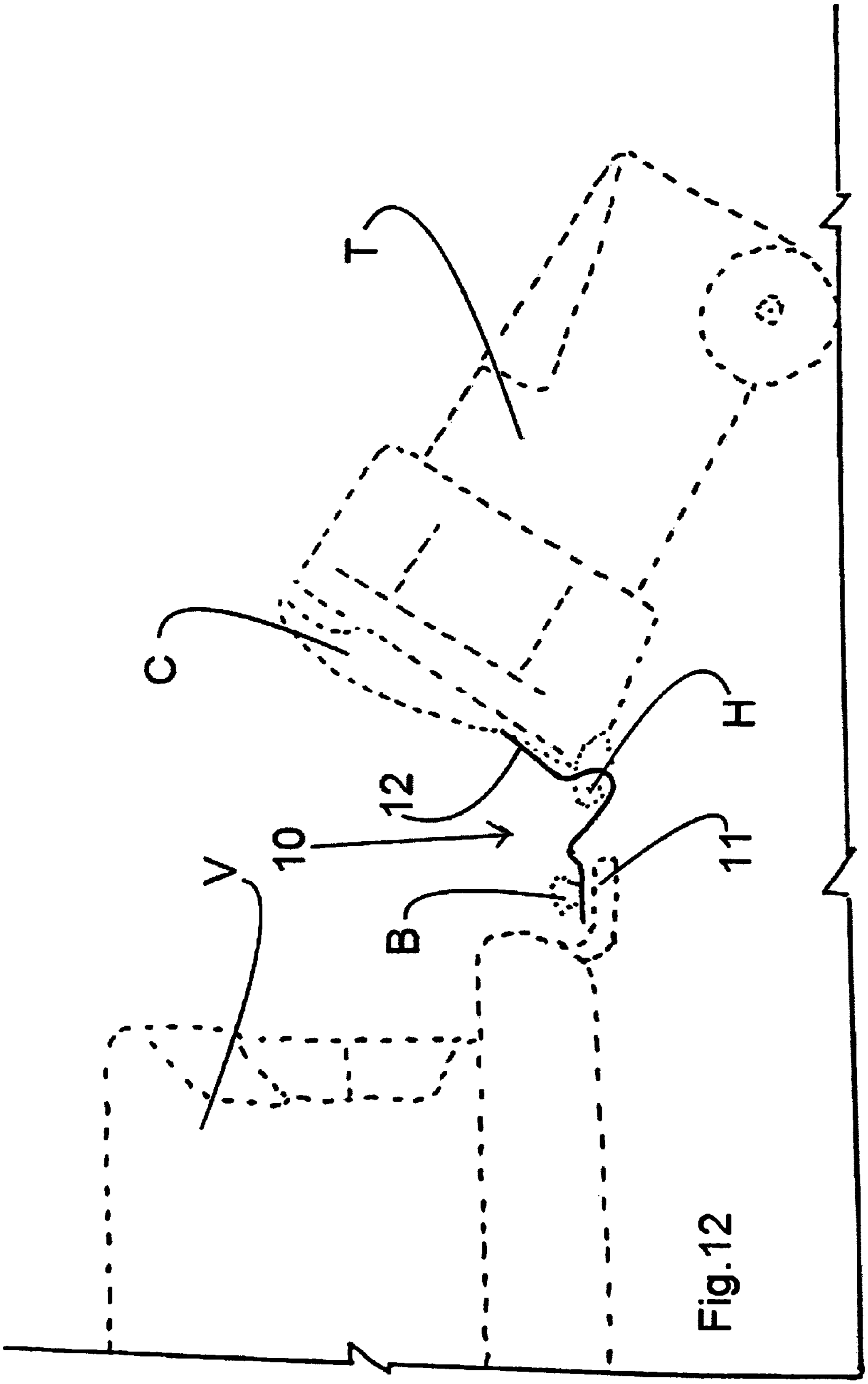
FIG. 12 is a environmental, side elevation view of the trash bin towing bracket engaged into a hitch ball of a vehicle and engaged into a conventional trash bin according to second embodiment.

FIG. 12 shows the environmental, side elevation view of the towing bracket, 10, engaged into trash bin, T, and the towing vehicle hitch ball, B, the second end, 12, inserted between the handles of the trash bin, H, and its body and rests on the trash bin lid, C.

The obtuse interior angle of the receiving end, 11, and the mounting end, 12, is approximately one-hundred-twenty degrees

DETAILED DESCRIPTION

FIGS. 1 and 3—First Embodiment—

One embodiment of the trash bin bracket, 10, is illustrated in FIG. 1. The bracket has a first end, 11, consisting of a bended to hook shape, 13. The bottom portion of the hook consists an aperture, 20.

In the middle section of the trash bin bracket, 10, have ranks of obtuse interior and exterior angles to form a shape for handles to rest, 14. The second end, 12, of the bracket has obtuse angle to form a shape for mounting with two forked extensions, according to my first embodiment.

The elevated side view of the aforementioned ranks of obtuse angles shown in FIG. 3.

In this embodiment, the device consist single rigid metal sheet cut and shaped in a unitary body or resin molded into aforementioned shape.

Operation—FIGS. 2, 4, 5, 6

The instant attention is drawn to a device dubbed "Bracket for Towing Single and Multiple Trash Bins", which is utilized to tow trash bins with lids in a very simple way. The trash bins are of conventional, single handle; wheeled type with hinged lids and mostly provided or subsidized by municipalities, used for collecting trash and recycled materials.

The bracket comprising ranks of obtuse interior and exterior angles to form a shape for to engage common wheeled trash bins, and common hitch balls and trash bin lifting handles.

As shown FIG. 2, the preferred embodiment bracket can be easily attached to any common trailer hitch ball, B. (automobile, tractor, SUV, pickup truck etc.) In use, the trash bin towing bracket, 10, according to the first embodiment may be installed in operative disposition on a trash bin, T, by inserting the one end, 12, through the aperture between the rim of the trash bin and its handle, H. By engaging the bracket into trash can, T, the handle rest, 14, section of the bracket will accommodate trash bin handle, H. This end will be hereafter referred to as "mounting end" for the sake of convenience.

As best seen in FIG. 4, while mounting end, 12, of the bracket engaged to the trash bin, tilting the trash bin, T, down towards hitch ball, B, allowing aperture, 20, fit into the hitch ball, B. Once aforementioned action taken, the other end, 11, of the bracket will engage into the hitch ball, B, therefore, the trash bin, T, may be held in operative tilt angle such that the wheels of the trash bin engage with the ground to support the trash bin thereon. This end will be hereafter referred to as "receiving end" for the sake of convenience.

The invented bracket is using gravity force in advantage to secure and hold the trash bin in place. In normal conditions, the time for such attachment is less than a minute. Bracket is removable quickly as soon as the towing completed, leaving the vehicle hitch ball and trash bin in their original state As best illustrated FIGS. 6 and 7, the preferred embodiment bracket can be used to attach a second trash bin, T2, into the trash bin, T1, which is already engaged to the hitch ball of a vehicle, V, for multiple bin towing. In use, the preferred embodiment of trash bin towing bracket, 10, according to the first embodiment, may be installed in operative disposition on a trash bin by hooking the receiving end, 11, with hook, 13, to the lifting handle, L, of the tilted trash bin and attaching the mounting end, 12, through the aperture between the rim of the second trash bin and its body.

DETAILED DESCRIPTION

FIGS. 9 and 11—Second Embodiment—

Second embodiment of the trash bin bracket, 10, is illustrated in FIG. 9. The bracket has a first end, 11, and an aperture, 20.

In the middle section of the trash bin bracket, 10, has a ranks of obtuse interior and exterior angles to form a shape for handles to rest, 14. The second end, 12, of the bracket has obtuse angle to form a shape for mounting with a extension.

The elevated side view of the aforementioned ranks of obtuse angles shown in FIG. 11.

In this embodiment, the device consist single rigid metal sheet cut and shaped in a unitary body or resin molded into aforementioned shape.

Operation—FIGS. 10, 12

The instant attention is drawn to a device dubbed "The Trash Bin Towing Bracket", which is utilized to tow trash bins with lids in a very simple way. The trash bins are of conventional, single handle; wheeled type with hinged lids and mostly provided or subsidized by municipalities, used for collecting trash and recycled materials.

The bracket comprising ranks of obtuse interior and exterior angles to form a shape for to engage common wheeled trash bins, and common hitch balls and trash bin lifting handles.

As shown FIG. 10, the preferred embodiment bracket can be easily attached to any common trailer hitch ball, B. (automobile, tractor, SUV, pickup truck etc.) In use, the trash bin towing bracket, 10, according to the first embodiment may be installed in operative disposition on a trash bin, T, by inserting the one end, 12, through the aperture between the rim of the trash bin and its handle, H, towards upright. By engaging the bracket into trash bin, T, the handle rest, 14, section of the bracket will accommodate trash bin handle, H. This end will be hereafter referred to as "mounting end" for the sake of convenience.

As best seen in FIG. 12, while mounting end, 12, of the bracket engaged to the trash bin, tilting the trash bin, T, down towards hitch ball, B, allowing aperture, 20, fit into the hitch ball, B. Once aforementioned action taken, the other end, 11, of the bracket will engage into the hitch ball, B, therefore, the trash bin, T, may be held in operative tilt angle such that the wheels of the trash bin engage with the ground to support the trash bin thereon. This end will be hereafter referred to as "receiving end" for the sake of convenience.

Furthermore it will not need any bolts, nuts, pins and washers etc. to secure the bin. When the bracket fitted to trash bin, the bracket also secures the trash bin lid, preventing opening and losing its cargo. The towing bracket is capable of towing most conventional wheeled trash bins up to and including ninety gallons.

It has been determined that the maximum safe speed for towing, when using the towing bracket in normal conditions, is about ten miles an hour. More care should be taken if the road and weather conditions are difficult. The user should not drive reverse while towing, as such operation may function to divert the trash bin/s.

The towing bracket should be used only in private roads, the users should not use it in public properties and roads.

The towing bracket requires no maintenance at all.

Accordingly, it is principal object of my and second embodiment of trash bin bracket to provide a simple towing device for wheeled trash receptacles with lids.

It is another object of my first embodiment of trash bin bracket to provide a towing device for a wheeled trash receptacle with lid, which identical device can be also use to tow a second or more trash receptacle simultaneously.

It is another object of my first and second embodiment of trash bin bracket to provide a towing device for a wheeled trash receptacle with lid, which bracket that can be quickly and easily engage and disengage to the trash bin and receiving vehicle.

It is an object of my first and second embodiment of trash bin bracket to provide a towing bracket for a wheeled trash bin with lid, which bracket can secure the cargo of the trash bin by pressing the lid close while towing.

Still another object of my first and second embodiment of trash bin bracket is provide a towing bracket for a wheeled trash bin with lid, which can be utilized with various standard-sized, wheeled trash receptacles.

It is an object of my first and second embodiment of trash bin bracket to provide simple and economical, one piece, lightweight, maintenance free and weld free, dependable and fully effective in accomplishing their intended purposes.

ADVANTAGES

From description above, a number of advantages of some embodiments of my trash bin towing bracket become evident:

The invented bracket is simple, quick and effective way engaging both the wheeled trash bin and the vehicle hitch ball, without any nuts, bolts, chains etc.

The bracket consists of one unitary piece, maintenance free and lightweight and therefore economical alternative to prior arts.

One bracket can be used for towing a single trash bin, but every additional bracket can connect an additional trash bin and allocate to tow multiple trash bins simultaneously.

The bracket is quickly and easily detachable from both trash bins and the vehicle attachment point without any tool or special skill.

When the bracket engaged into trash bin for towing, the bracket secures the lid of the trash bin, preventing opening up while towing.

Due the distance to the trash pick up point and steep driveway some homeowners are known to place recyclable materials to the trash, as dragging two trash bins requires much effort and time. The bracket makes transporting multiple bins easier, therefore promotes recycling.

CONCLUSIONS, RAMIFICATIONS AND SCOPE

Thus the reader will see that at least two embodiment of the trash bin bracket provides one piece unitary body, simple, and economical, maintenance free, weld free, dependable and fully effective in accomplishing towing a trash bin and connecting two trash bins to be towed simultaneously.

Figure 13:
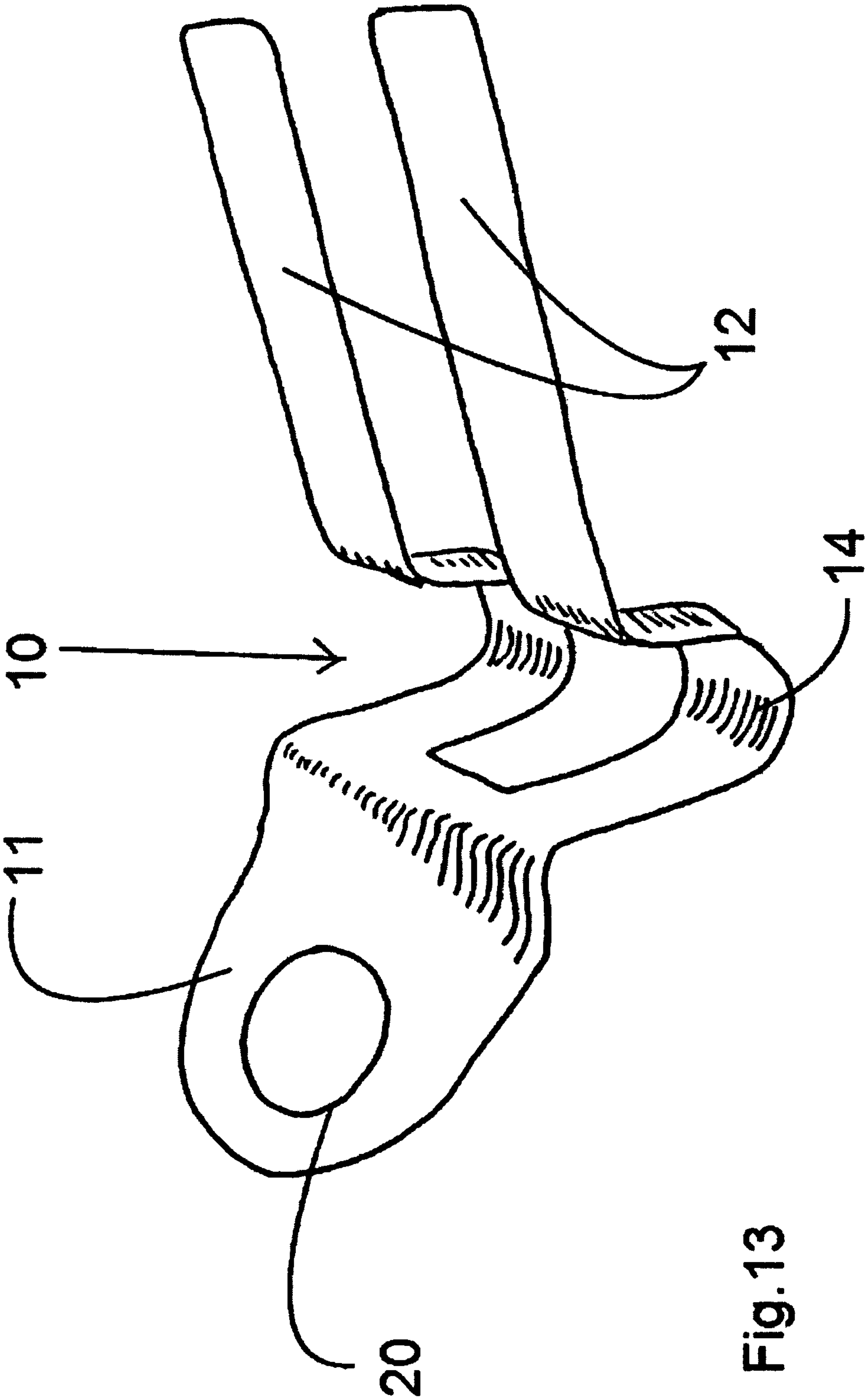
FIG. 13 is an environmental, perspective view of the trash bin towing bracket according to another embodiment.

While my above description contains many specificities, these should not be construed as limitations on the scope, but rather as an exemplification of several preferred embodiments thereof. Many other variations possible. For example an alternative embodiment of trash bin bracket can be with a single whole non-slatted mounting end as shown in FIG. 7. This embodiment will fit the trash can handles without any center support. For example an alternative embodiment of trash bin bracket can be with a bifurcated, fork shaped mounting end as shown in FIG. 13. This embodiment will fit the trash can handles with a center support.

Another example is using alternative structural materials; one or more "one direction operational hinges" can be added on the body to fold and save storage space. Another example can be modifying the receiving end/middle section to make it narrow in order to fit into human hand more comfortable.

An additional embodiment is shown at FIG. 8, wherein the hook is turned reverse direction and aperture, 20, is relocated to receiving end, 11.

While above my embodiments requires hitch ball engagement, some vehicles does not have hitch receiver and hitch ball. Same embodiments can be engaged into "vertical handles with suctions cups" which can be easily attached to smooth surface located at the back or front of any vehicle providing a structure similar to hitch ball position, pointing upwards.

I presently contemplate for these embodiments that the trash bin bracket have a rectangular cross section and made of austenitic steel. However it can have different cross sections such as oval, triangular, circular etc., and different sizes and materials, such as stainless steel, aluminum, high carbon steel, titanium, polycarbonate, ABS etc.

Thus the scope of the embodiments should be determined by the appended claims and their legal equivalents, rather than by the examples given.

I claim:

1. A bracket for towing single and multiple trash bins behind a vehicle, said bracket comprising:

a main body having a first end, a second end, and a middle section;

wherein said first end is bent into a hook and also includes an aperture, said aperture being capable of engagement with a vehicle hitch ball and said hook being capable of engagement with a trash bin lifting handle;

wherein said middle section includes a handle rest having a partially open cylindrical shape capable of engagement with a trash bin handle, said handle rest having a first end that is connected at a first angle to the first end of said main body;

and wherein said second end is a generally planar extension that is connected to and extends away from a second end of the handle rest at a second angle, said first and second angles being obtuse with respect to the first end of the main body such that the second end extends upwardly and away from the first end of the main body.

2. The bracket of claim 1, wherein the second end is capable of being inserted through an opening between the body of a trash bin and its handle.

3. The bracket of claim 2, wherein the second end is further capable of resting on top of a trash bin lid in order to apply pressure to the lid and help keep the lid shut.

4. The bracket of claim 1, wherein said first and said angles are such that a trash bin may be held and towed at a tilted angle such that its wheels engage with the ground.

5. The bracket of claim 1, wherein a single first bracket may be used to tow a single first trash bin by engaging the aperture with a vehicle hitch ball, by engaging the handle rest with a handle of the first trash bin, and by inserting the second end through an opening between a body of the first trash bin and its handle in order to hold its lid shut.

6. The bracket of claim 5, wherein a second bracket having identical structure to the first bracket may be used to tow a second trash bin by engaging the hook of the second bracket with a lifting handle of the first trash bin, by engaging the handle rest of the second bracket with a handle of the second trash bin, and by inserting the second end of the second bracket through an opening between a body of the second trash being and its handle in order to hold its lid shut.

7. The bracket of claim 6, wherein additional brackets can be used to tow additional trash bins.

8. The bracket of claim 1, wherein the second end is forked.

* * * * *